INVENTORS:
FRANK H. SCHWAIGER
ROBERT C. GADSBY
JOSEPH SCHWAIGER
BY Gravely, Lieder & Woodruff
ATTORNEYS.

Oct. 18, 1966　　F. H. SCHWAIGER ET AL　　3,279,534
PERCOLATOR FOR A BREW KETTLE

Filed Dec. 27, 1965　　　　　　　　　　　　　　3 Sheets-Sheet 2

INVENTORS:
FRANK H. SCHWAIGER
ROBERT C. GADSBY
JOSEPH SCHWAIGER

BY Gravely, Lieder & Woodruff
ATTORNEYS

United States Patent Office 3,279,534
Patented Oct. 18, 1966

3,279,534
PERCOLATOR FOR A BREW KETTLE
Frank H. Schwaiger, Ladue, Robert C. Gadsby, Town and Country, and Joseph Schwaiger, Sappington, Mo., assignors to Anheuser-Busch, Incorporated, St. Louis, Mo., a corporation of Missouri
Filed Dec. 27, 1965, Ser. No. 516,315
11 Claims. (Cl. 165—108)

This invention relates to an improved percolator for a brew kettle or the like, and in particular, to a percolator having heater sections which may be conveniently cleaned and replaced or repaired if necessary.

One of the principal objects of the present invention is to provide an improved percolator for brew kettles, such as are used in the brewing industry. Another object is to provide in such a percolator a plurality of flat heating sections which can be easily cleaned and replaced or repaired if necessary. Another object is to provide an improved percolator design which is shaped to distribute heat in a predetermined manner and which is shaped so as to create a natural flow of the liquid being heated within the percolator. Another object is to provide a percolator of a design in which there is little likelihood of trapping condensate therein. Another object is to provide connectors between the relatively flat heater sections which prevent entrapment of the liquid so as to prevent the overheating of any liquid which might otherwise become entrapped.

These and other objects and advantages will become apparent hereinafter.

The present invention is embodied in a percolator having a plurality of relatively flat heater sections with baffles therein, said sections being arranged in an enclosed form, said percolator having an upstanding steam pipe extending therethrough with transverse pipes leading therefrom to the top of each section, each of said heater sections having baffles therein to direct said steam downwardly in a long curved path to the bottom from where it is carried off, said heater sections being sloped inwardly toward the top to give proper flow to the heated liquid.

Figure 1:
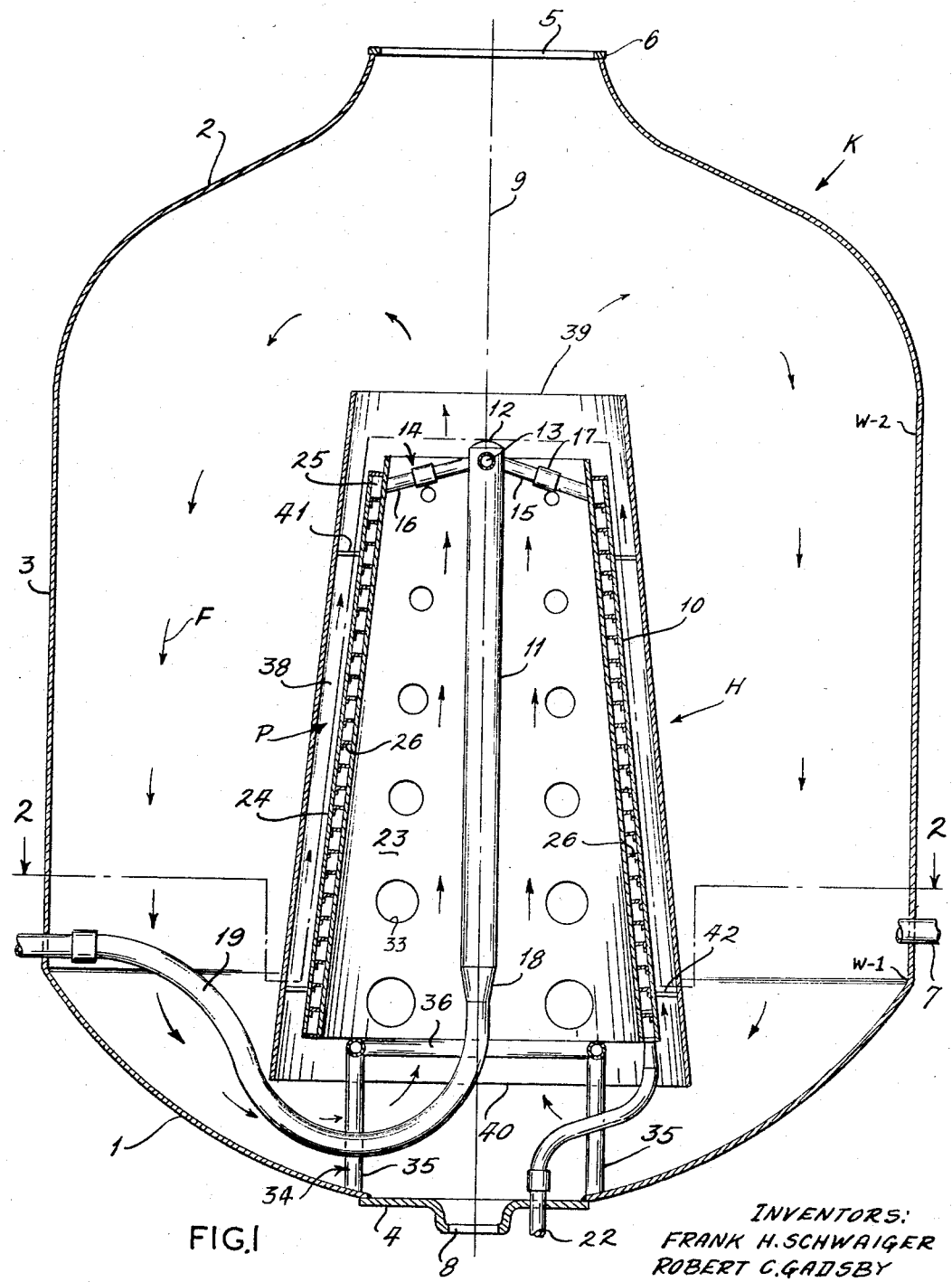
Figure 2:
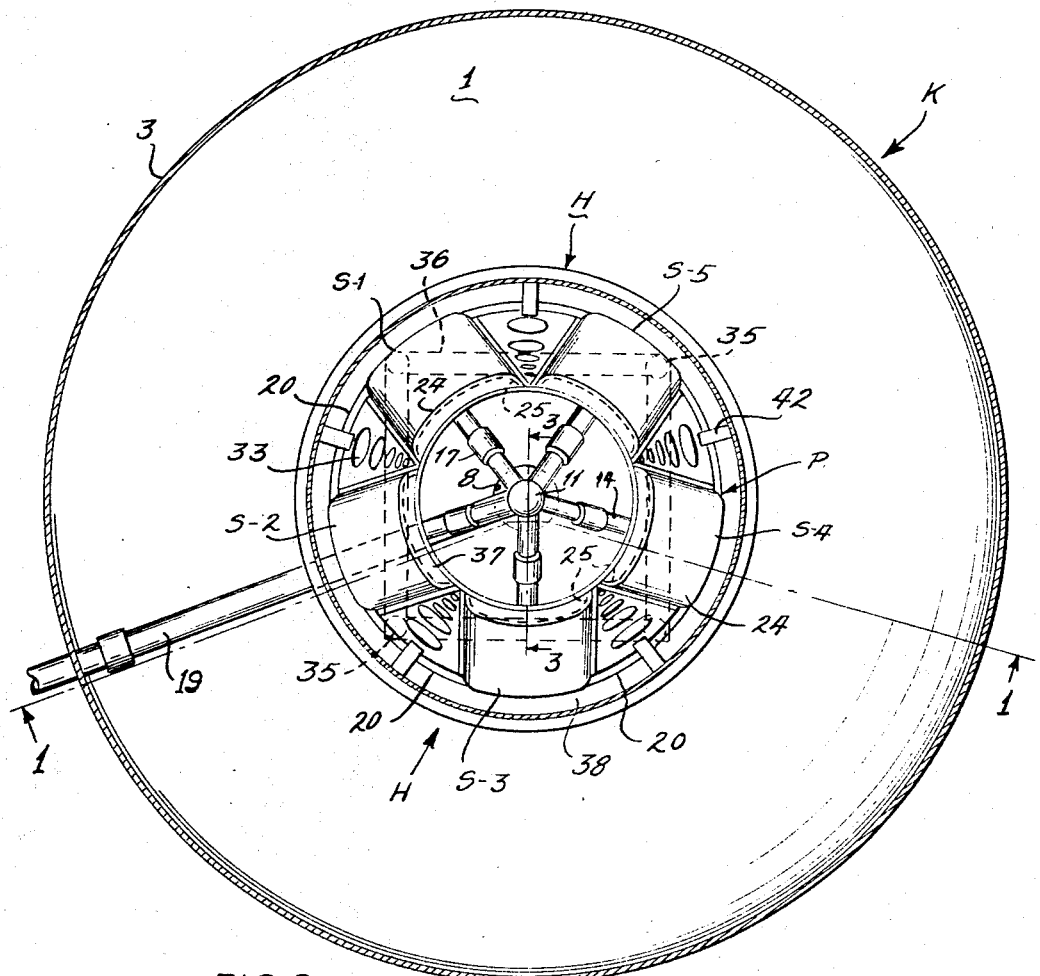
Figure 3:
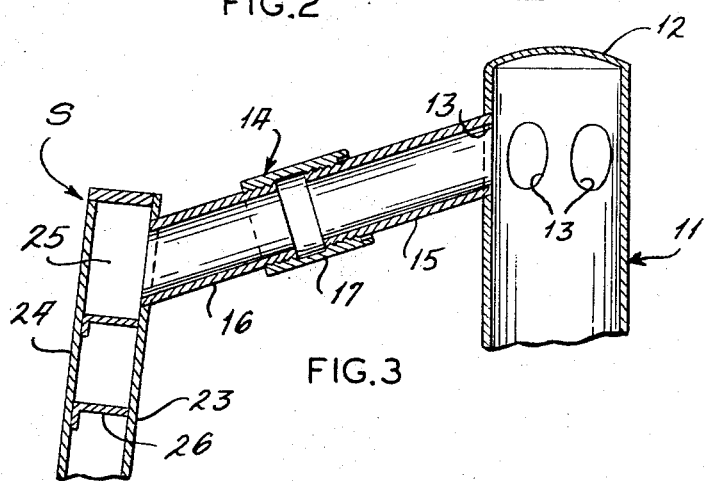
Figure 4:
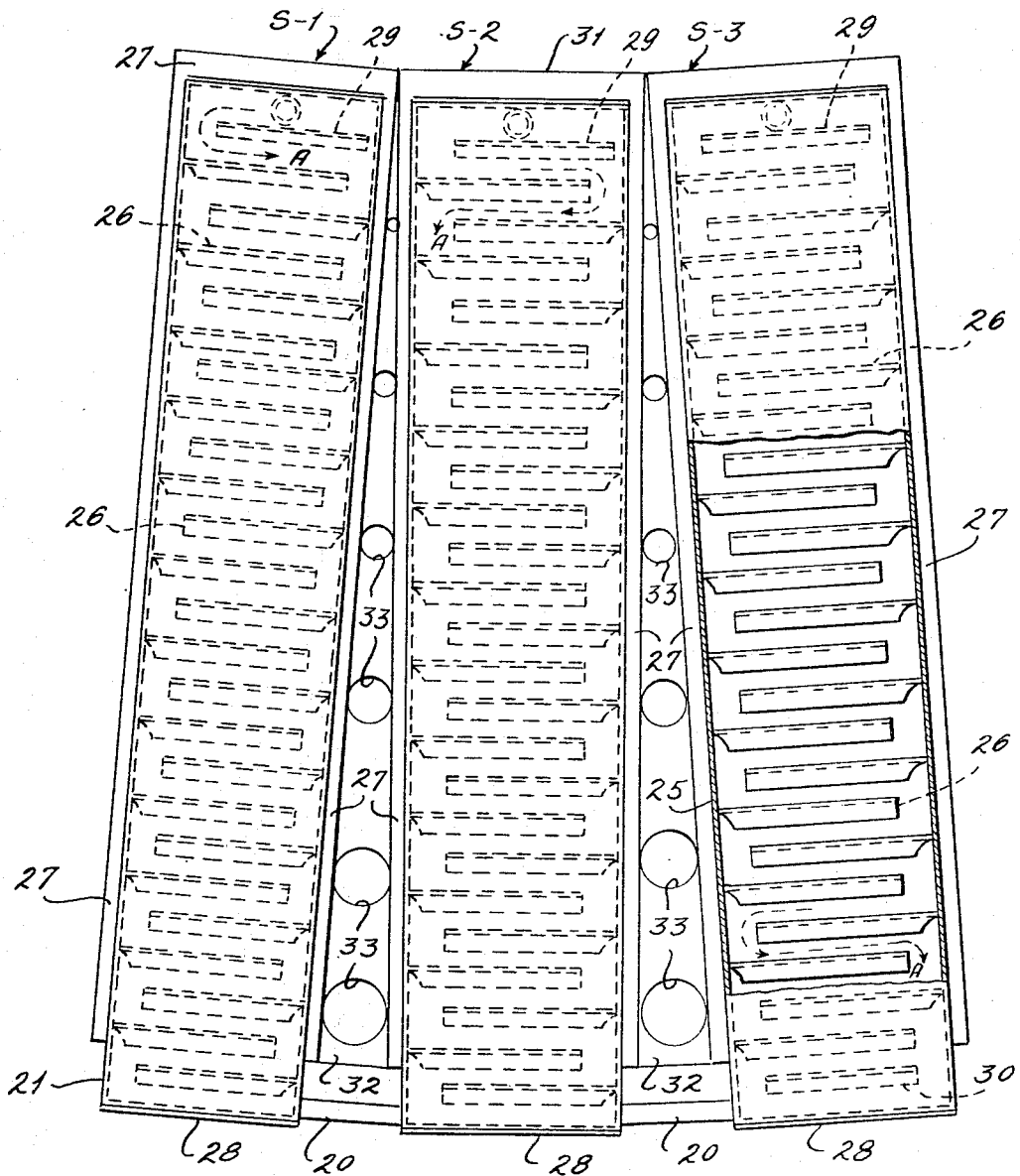

The invention also consists in the parts and in the arrangements and combinations of parts hereinafter described and claimed. In the accompanying drawings which form part of this specification and wherein like numerals and symbols refer to like parts wherever they occur:

FIG. 1 is a fragmentary vertical cross-sectional view of a brew kettle showing a percolator therein embodying the present invention, FIG. 2 is a horizontal cross-sectional view taken along the line 2—2 of FIG. 1 showing the top of said percolator, FIG. 3 is an enlarged vertical cross-sectional view taken along the line 3—3 of FIG. 2, and FIG. 4 is an expanded or flattened view showing three of the five rectangular sections of the percolator.

Referring now to the drawings in detail, it will be seen that the embodiment of the invention which has been illustrated comprises a percolator P mounted in the central portion of a brew kettle K.

The brew kettle K is shaped to be used with the percolator P embodying the present invention. The brew kettle K has a curved bottom 1, a curved top 2, and a tubular or cylindrical wall 3 therebetween. The curved bottom 1 is provided with a central bottom support 4 which supports the brew kettle K with the percolator P therein. The curved top 2 is provided with a central opening 5 with a rim 6 therearound which is connected with an upstanding stack or flue to carry away the vapors from the brew kettle K. The brew kettle K is provided with a suitable inlet 7 and outlet 8 for the material being cooked. Brew kettles K may vary in size, but such kettles frequently are of the order of about 13 feet in diameter and about 13 feet tall and can contain about 350 barrels of liquid material. The brew kettle K has a center line 9. It is made from metal, such as copper, although stainless steel may be used.

The main heating portion 10 of the percolator P comprises a plurality of rectangular heater sections S mounted angularly with respect to one another in circumscribing relation around the center line 9 of the percolator P. The percolator P is provided with an upstanding central steam or heater pipe 11 having a top portion 12 with openings 13 therein and with transverse pipes 14 extending outwardly therefrom to each of said heater sections S. Each transverse pipe 14 slopes slightly downwardly and comprises an inner portion 15 connected to the pipe 11 and an outer portion 16 connected to the heater section S with externally threaded ends which are connected by an internally threaded sleeve 17. The heater pipe 11 has a bottom portion 18 of reduced diameter to which is attached a curved tube 19 which extends downwardly beneath said rectangular sections S and then outwardly through a wall 3 of the brew kettle K. A drain tube 20 connects the lower ends 21 of each of the heater sections S, and has a vertical drain tube 22 extending downwardly from one section S–3 to the outside of the brew kettle K.

Each rectangular section S is provided with an inner wall 23 and an outer wall 24 in spaced parallel relation with end walls 25 closing the upstanding edges thereof to form a thin upstanding enclosure. Baffles 26 are mounted between said walls 23 and 24 in a position which slopes slightly from the horizontal. The baffles 26 are shorter in width than the walls 23 and 24. One end of each baffle 26 contacts an end wall 25 with the other end spaced from the opposite end wall 25. The baffles 26 are mounted in staggered relation, so that any fluid passing downwardly through a rectangular section must move in a longer path shown by the dotted line and arrow A. This path may be described as a zig-zag path or a tortuous path. Its purpose is to obtain increased efficiency or heat transfer from the steam through the walls 23, 24, and 25 as the steam moves downwardly in its zig-zag path from the transverse pipe 14 at the top of each section to drain tube 20 at the bottom. The inner walls 23 are slightly larger than the outer walls 24 so as to form a flange 27 therearound which is used to join the sections S together. The sections S can be cut apart along the flanges 27, so that an entire section may be removed without cutting into any passage within the section S that carries steam.

Each baffle 26 has a slightly downward slope so that any condensation formed in the path A will ultimately drip down to the bottom 28 and not be entrapped on any particular baffle 26. The top baffle 29 of each section S is shortened at both ends so that each end thereof will be in spaced relation from the end walls 25. This prevents entrapment of the steam and allows it to seek its natural path during the first phase of its pass through each section S. The bottom baffle 30 of the section S–3, which contains the vertical drain tube 22, is also shortened so that both of its ends are spaced inwardly from the end walls 25. The sections S, including all walls and the baffles, are made from metal, preferably copper or stainless steel. The metal must be non-corroding, a good conductor of heat, and satisfactory for use with a food product such as beer wort. The inside diameter of the percolator P at the levels of the bottoms 28 is about 4 feet, which gradually tapers to an inside diameter of 3 feet, at the top portion 31, in a vertical distance of about 8 feet.

Each section S is mounted in spaced relation from the center line 9 with its upper portion 31 closer to the center line 9 than its lower portion 28. This gives the percolator P what may be called a conical shape, which is desired. Actually, this shape is in the form of a hollow frustum of a cone. Each section S is connected to the other by means which are wider at the lower ends 21 than at the top 31, such as a triangular connector 32. The joining preferably is by welding. Each connector 32 is provided with openings 33 therein so that no liquid can become entrapped adjacent to the connectors 32 and within the central hollow portion of the percolator P.

The percolator P is mounted within the brew kettle K in spaced relation from the curved bottom 1 on a pedestal 34 having legs 35 with horizontal supports 36 therebetween on which the bottoms 28 of the sections S rest and are supported. The sections S are connected at their bottoms 28 by the drain 20 so that the spent steam will be directed from each section S to one single drain tube 22. If desired, however, each section S may have its own separate drain tube and the upper portion 37 of the percolator P may be provided with a shield or hood H to aid in the flow of heated liquid within the brew kettle K. The hood H slopes upwardly and inwardly, and is generally conical in shape and substantially in spaced parallel relation to the outer portion of the percolator P forming a space 38 therebetween. This space 38 is of constant width, but its area becomes small as the inside and outside diameters decrease from the bottom to the top. The hood H has a top edge 39 above the upper portion 37 of the percolator P and a lower edge 40 beneath the bottoms 28 of the sections S. The hood H is maintained in spaced circumscribing relation to the percolator P by suitable upper braces 41 and lower braces 42, which preferably are connected to the connectors 32. The hood H may be fabricated in one piece or in as many upstanding segments as there are heater sections S.

The operation of this percolator P will be described in a brew kettle used to heat wort in the brewing process for making beer, but it is understood that the percolator can be used in other vessels in other processes. In operation, with all parts cleaned and in working order, wort is directed into the brew kettle through the wort inlet 7 until the level of the wort reaches approximately the point W-1. While the kettle filling operation continues to the point W-2, at which time the inlet valve 7 is closed, steam is directed into the percolator P through the tube 19 upwardly through the central steam pipe 11, and then outwardly through each of the five transverse pipes 14 to the top of the sections S. The steam then moves downwardly through each of each sections S in a zig-zag manner to the bottom 28 where it is directed to the drain tubes 20 and 22 and drawn off.

Thus, the percolator P has a central vertical heating element or pipe 11 and a circumscribing heating element S, made up of the heater sections S-1, S-2, S-3, S-4, and S-5, which is of smaller diameter at the top than at the bottom. This slight inward slope, together with the heat, produces an upward flow of wort through the hollow central portion of the percolator and a downward flow of wort outwardly of the percolator, such as shown by the arrows F. The hood H further aids this flow which is created by the position and shape and size of the percolator P in the brew kettle K. It is important to have such a flow to heat the wort uniformly and not to overheat any portion of it thereby permanently damaging it. The device is arranged so that as the wort flows upwardly through the percolator it first contacts the cooler steam at the bottom of each section and is heated as it moves upwardly through the diminishing diameter by the hotter steam near the top of each section. The percolator thus produces a nozzle or mushroom effect near the top thereof to propel the wort upwardly in a controlled and predetermined manner. This control is further enhanced by the size and shape and position of the hood, which acts as a baffle to control the flow of the wort upward adjacent to the outside of the percolator. The wort circulates through the percolator thus providing a uniform start and maintenance of boiling of the entire contents of the kettle. It has been established that the creation of a mushrooming boil originating at the center of the kettle and moving constantly to the outside of the kettle is beneficial for coagulating protein from the wort which becomes visible in a coarse flaking of precipitate in the kettle wort. The coarser the precipitation appears the better are the chances for clarification during the subsequent steps of processing and the better will be the stability in the finished product.

A percolator P embodying this invention takes away condensate completely in the perfect desired manner. This construction concentrates the heat in the upper portion of the percolator, which is desired. The liquid boils from the inside to the outside, so as to push itself upward through the percolator and then outward to produce a mushrooming or fountain effect within the kettle. In practice, a brewery or other user of this invention may have one space heater section S which can be installed in the percolator P in place of one of the original heater sections S in a couple of hours. Each heater section S is so dimensioned that it fits through a manhole or opening in the brew kettle K.

Each heater section S is designed so that it can be removed from the other sections by cutting through the upstanding flanges 27, so that a welder's torch need never penetrate any surface which separates steam from wort. This reduces the possibility of any leakage in the system when any section S must be replaced or repaired.

The brew kettle K is also provided with suitable piping and nozzles to clean the inside surfaces of the kettle, percolator, and hood automatically after the wort has been removed from the kettle K. The water cleaning system is conventional and is not shown in the drawings, but such a system is preferred in order to reduce the manpower necessary to operate the brew kettle.

The hood H acts as a baffle or insulation to prevent heat exchange from the percolator P to the outer walls of the brew kettle K and to the liquid inwardly from said walls. This forces the heat from the percolator P upward and aids the upward movement of the liquid within the percolator P and within the hood H to aid the mushrooming effect which is desired.

This invention is intended to cover all changes and modifications of the example of the invention herein chosen for purposes of the disclosure which do not constitute departures from the spirit and scope of the invention.

What is claimed is:

1. In a brew kettle having a curved bottom and a curved top with a tubular wall therebetween, said brew kettle having suitable inlets and outlets for wort and an opening at the top for permitting vapors to leave said brew kettle, the improvement which comprises a percolator positioned within said brew kettle in spaced relation from said curved bottom and curved top and tubular wall of said brew kettle, said percolator mounted on a support in spaced relation from said curved bottom, said percolator including a plurality of heater sections with baffles therein, said sections being arranged in circumscribing relation in an enclosed form, said percolator having a heater pipe extending upwardly therethrough, transverse pipes positioned between the top portion of said heater pipe and the top portion of each of said heater sections, said heater sections being adapted to direct said steam downwardly therein along a curved path to the bottom of each of said sections, and means for directing said steam out of said brew kettle.

2. The improvement set forth in claim 1 wherein each heater section is formed from relatively flat walls spaced in substantially parallel relation.

3. The improvement set forth in claim 1 wherein each heater section contains baffles therein in substantially horizontal spaced parallel staggered relation to force the steam downwardly therethrough in a long tortuous path.

4. The improvement set forth in claim 1 wherein each heater section is substantially rectangular with flat outside surfaces which are easy to clean.

5. The improvement set forth in claim 1 wherein said percolator is substantially in the shape of a frustum of a hollow cone with the inside diameter at the top being less than the inside diameter at the bottom to promote the upward flow of heated liquid therethrough.

6. The improvement set forth in claim 1 wherein each heater section is provided with a flange along its upstanding edges, said flanges being adapted to join said sections together and being capable of being cut through to remove a section without cutting into any chamber within the section which carries steam.

7. The improvement set forth in claim 1 wherein said heater sections are joined by connectors, said connectors being wider at the bottom than at the top and having openings therein to allow flow therethrough to prevent the entrapment and the overheating of the liquid being heated.

8. The improvement set forth in claim 1 wherein said percolator is provided with a hood circumscribing the outer surface thereof.

9. The improvement set forth in claim 8 wherein the top edge of said hood is above the top edge of said percolator and is of greater diameter.

10. The improvement set forth in claim 8 wherein said hood circumscribes said percolator in spaced substantially parallel relation to form an annular space therebetween, said annular space becoming smaller in area from bottom to top due to the decrease in diameter thereof.

11. The improvement set forth in claim 8 wherein said hood has a bottom edge larger in diameter and spaced below the bottom edge of the percolator, and a top edge larger in diameter and spaced above the top edge of the percolator.

References Cited by the Examiner

UNITED STATES PATENTS

| | | | |
|---|---|---|---|
| 285,736 | 9/1883 | Dopp | 165—108 |
| 442,011 | 12/1890 | Bulkens | 165—108 |
| 1,372,123 | 3/1921 | De Cew | 126—378 |
| 1,650,122 | 11/1927 | Grantzdorffer | 165—108 |
| 2,473,641 | 6/1949 | Feldstein | 165—108 X |

FOREIGN PATENTS 544,529   2/1956   Belgium.

FREDERICK L. MATTESON, JR., *Primary Examiner.*

R. A. DUA, *Assistant Examiner.*